N. N. McLeod.

Hose Coupling

No. 3,062. Reissued Aug. 4. 1868.

Witnesses.
Chas. Brouden
Michael O'Keffe

Inventor.
N. N. McLeod

UNITED STATES PATENT OFFICE.

AMOS BROADNAX, OF MONT CLAIR, NEW JERSEY, AND ROLLIN B. GRAY, OF BROOKLYN, NEW YORK, ASSIGNEES, BY MESNE ASSIGNMENTS, OF N. N. McLEOD, OF ST. LOUIS, MISSOURI.

IMPROVEMENT IN HOSE-COUPLINGS.

Specification forming part of Letters Patent No. 24,179, dated May 24, 1859; Reissue No. 3,062, dated August 4, 1868.

*To all whom it may concern:*

Be it known that N. N. McLEOD, late of St. Louis, Missouri, but now deceased, was, on or before the 25th day of May, 1859, the first, true, and original inventor of certain new and useful Improvements in Pipe or Hose Coupling; and we, AMOS BROADNAX and ROLLIN B. GRAY, sole assignees of the said McLEOD, do hereby declare the following to be a full, clear, and exact description of said invention, reference being had to the annexed drawing, making part of this specification, and in which—

Figure 1:
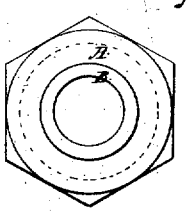
Figure 2:
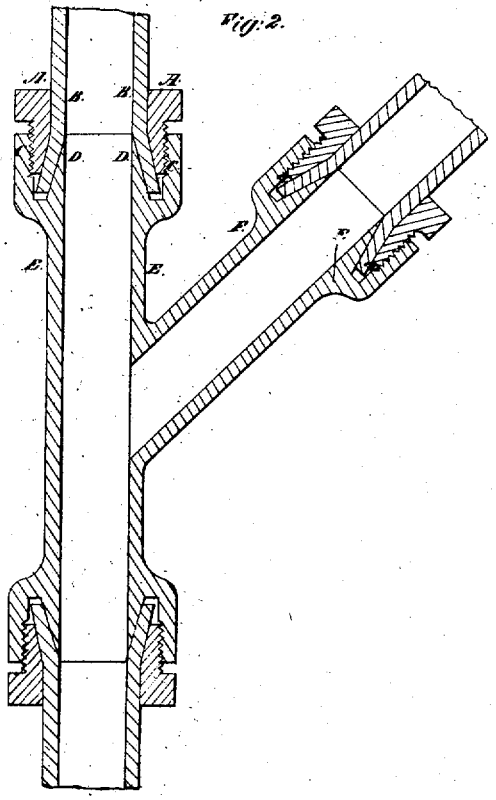
Figure 3:
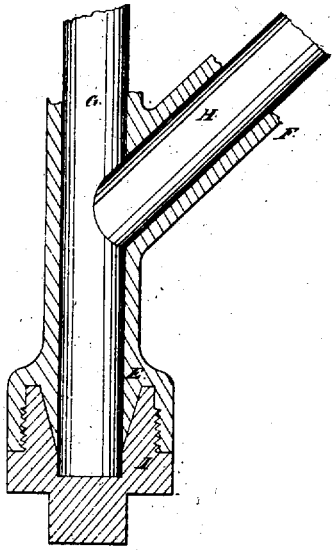

Figure 1 illustrates an end view, and Fig. 2 a longitudinal section, of said coupling; and Fig. 3 shows a longitudinal section through said coupling, and also a view of the core upon which it is cast.

The invention of said McLEOD consists in joining or uniting the end or ends of lead pipe or other plastic or yielding tubing, such as tin, leather, or india-rubber, upon a coupling consisting of a pipe susceptible of being fitted with branches, and the length whereof may be varied, and which is fitted with one or more tubular screw nuts and threads, and made with a conical or beveled end or ends, by which a funneled or beveled shaped end of a pipe or tube can, with the aid of a wrench merely, be tightly and firmly united to it without obstructing the interior of the pipe, and without the aid of solder.

The invention will be readily understood by reference to the drawing, in which is illustrated a coupling consisting of a tube, E, fitted with a branch, F, a conical or bevel end or lip, D, a tubular screw-nut, A, which screws into an angular cavity, G. Now, to make a joint upon this coupling, it is only necessary to open or bevel the ends of the pipe or tube, first slipping the nut thereon, and then to bring it up against or on the lip or bevel end of the coupling-tube and screw up the nut.

By these means great facility is offered for supplying a pipe with as many branches as may be desired; and a very ready means of repair is offered, as all that is necessary to perfect a line of pipe is to cut out the fractured part and supply its place with a tube-coupling of the required length, with or without a branch.

The coupling can be made in a variety of ways, but a very easy way of making it is to cast it upon cores, illustrated in the drawing by G, H, and I, all of which are made separately and taken out after the tube has been cast.

Having now described the nature, use, and advantage of said pipe or hose coupling, what we claim as the invention of said N. N. McLEOD, is—

Joining the end or ends of a pipe or tube by means of a tubular coupling, one end or each end thereof made conical or beveled, and having a tubular screw nut and thread, said connection being susceptible of receiving or having cast upon it a branch or branches without interfering with the construction of the joint or joints, all substantially as shown and described.

AMOS BROADNAX.
ROLLIN B. GRAY.

Witnesses:
EDWARD P. FLINT,
WELLINGTON LEE.